(12) United States Patent
Sayyed et al.

(10) Patent No.: US 11,436,334 B2
(45) Date of Patent: Sep. 6, 2022

(54) SYSTEMS AND METHODS FOR SECURING OPERATING SYSTEM APPLICATIONS WITH HARDWARE ROOT OF TRUST

(71) Applicant: Dell Products L.P., Round Rock, TX (US)

(72) Inventors: Ibrahim Sayyed, Georgetown, TX (US); Purushothama R. Malluru, Round Rock, TX (US); Chris C. Griffin, Cedar Park, TX (US); Chris E. Pepper, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/039,384

(22) Filed: Sep. 30, 2020

(65) Prior Publication Data

US 2022/0100861 A1    Mar. 31, 2022

(51) Int. Cl.
| | | |
|---|---|---|
| *G06F 7/04* | (2006.01) | |
| *H04N 7/16* | (2011.01) | |
| *G06F 21/57* | (2013.01) | |
| *G06F 21/56* | (2013.01) | |
| *G06F 21/64* | (2013.01) | |
| *G06F 21/54* | (2013.01) | |

(52) U.S. Cl.
CPC ............ *G06F 21/575* (2013.01); *G06F 21/54* (2013.01); *G06F 21/564* (2013.01); *G06F 21/565* (2013.01); *G06F 21/64* (2013.01)

(58) Field of Classification Search
CPC ...... G06F 21/575; G06F 21/54; G06F 21/564; G06F 21/565; G06F 21/64
See application file for complete search history.

(56) References Cited

U.S. PATENT DOCUMENTS

| | | | |
|---|---|---|---|
| 10,776,490 B1 * | 9/2020 | Gerraty ................. | G06F 21/575 |
| 2007/0260653 A1 * | 11/2007 | Jaffri ........................ | H04L 69/04 |
| 2016/0282927 A1 * | 9/2016 | Adams .................. | G06F 1/3206 |
| 2017/0308704 A1 * | 10/2017 | Ray ...................... | H04L 63/1441 |
| 2018/0075242 A1 * | 3/2018 | Khatri ................... | H04L 9/3263 |
| 2018/0239929 A1 * | 8/2018 | Shell ........................ | G06F 21/51 |
| 2018/0276387 A1 * | 9/2018 | Liu ........................ | G06F 21/575 |
| 2020/0320201 A1 * | 10/2020 | Robinson ............ | G06F 9/44536 |

* cited by examiner

*Primary Examiner* — Trong H Nguyen
(74) *Attorney, Agent, or Firm* — Jackson Walker L.L.P.

(57) ABSTRACT

An information handling system may include a processor and a basic input/output system communicatively coupled to the processor and embodied by executable instructions embodied in non-transitory computer readable media, the instructions configured to, when executed by the processor: extract from a boot manifest a list of files associated with operating system applications of the information handling system and respective signatures for each of the files; locate the files listed in the boot manifest on a partition of a storage resource accessible to the processor; attempt to verify signatures for each of the files as stored on the storage resource against their respective signatures set forth in the boot manifest; enable execution of a boot loader for the operating system and the operating system applications in response to successful verification of the signatures; and abort a boot process of the information handling system in response to unsuccessful verification of the signatures.

15 Claims, 3 Drawing Sheets

SYSTEMS AND METHODS FOR SECURING OPERATING SYSTEM APPLICATIONS WITH HARDWARE ROOT OF TRUST

TECHNICAL FIELD

The present disclosure relates in general to information handling systems, and more specifically to securing operating system applications in an information handling system with a hardware root of trust.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Protecting information handling systems from malicious code and malicious actors has become increasingly important, and providers (e.g., designers, manufacturers, vendors, etc.) of information handling systems and information handling system components often equip such information handling systems and components with security features to minimize or eliminate the risk of malicious attacks. For example, information handling systems equipped with a Unified Extensible Firmware Interface (UEFI) may verify that information handling system firmware is digitally signed, reducing the risk of malicious firmware rootkits. Further, secure boot-enabled UEFI systems may verify a boot loader signature to determine whether the boot loader is signed with a trusted certificate. Thus, if a rootkit or other item of malware replaces or tampers with the boot loader, the UEFI may prevent the boot loader from executing, thus preventing such malicious code from hijacking a boot process while concealing itself from an operations system.

Further, a boot loader may employ a "trusted boot" mechanism to verify a digital signature of an operating system kernel before loading the kernel. A kernel may, in turn, verify other components of the operating system startup process, including boot drivers, startup files, and early-launch anti-malware code. If any of such files are determined to have been modified, the trusted boot mechanism may detect such modification and prevent loading of the corrupted component.

While the approaches described above may be effective in detecting and preventing execution of malware through the boot process and up to execution of an operating system and its components, such approaches are insufficient to secure applications that are launched after the operating system completes its trusted boot process. For example, such a problem may manifest itself in pre-operating system environments (e.g., Windows PE) in which a custom shell may implement core usage functionality and such custom shell is not protected by the foregoing approaches. Thus, while traditional hardware security methods may detect and prevent boot issues, such methods may be insufficient to prevent malicious attacks in the tail end of the boot process with custom launcher applications.

SUMMARY

In accordance with the teachings of the present disclosure, the disadvantages and problems associated with securing operating system applications may be reduced or eliminated.

In accordance with embodiments of the present disclosure, an information handling system may include a processor and a basic input/output system communicatively coupled to the processor and embodied by executable instructions embodied in non-transitory computer readable media, the instructions configured to, when executed by the processor: extract from a boot manifest a list of files associated with operating system applications of the information handling system and respective signatures for each of the files; locate the files listed in the boot manifest on a partition of a storage resource accessible to the processor; attempt to verify signatures for each of the files as stored on the storage resource against their respective signatures set forth in the boot manifest; enable execution of a boot loader for the operating system and the operating system applications in response to successful verification of the signatures; and abort a boot process of the information handling system in response to unsuccessful verification of the signatures.

In accordance with these and other embodiments of the present disclosure, a method may include, in a basic input/output system of an information handling system, extracting from a boot manifest a list of files associated with operating system applications of the information handling system and respective signatures for each of the files, locating the files listed in the boot manifest on a partition of a storage resource of the information handling system, attempting to verify signatures for each of the files as stored on the storage resource against their respective signatures set forth in the boot manifest, enabling execution of a boot loader for the operating system and the operating system applications in response to successful verification of the signatures, and aborting a boot process of the information handling system in response to unsuccessful verification of the signatures.

In accordance with these and other embodiments of the present disclosure an article of manufacture may include a computer readable medium and computer-executable instructions carried on the computer readable medium, the instructions readable by a processor, the instructions, when read and executed, for causing the processor to, in a basic input/output system of an information handling system: extract from a boot manifest a list of files associated with operating system applications of the information handling system and respective signatures for each of the files; locate the files listed in the boot manifest on a partition of a storage resource of the information handling system; attempt to verify signatures for each of the files as stored on the storage resource against their respective signatures set forth in the boot manifest; enable execution of a boot loader for the operating system and the operating system applications in response to successful verification of the signatures; and abort a boot process of the information handling system in response to unsuccessful verification of the signatures.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
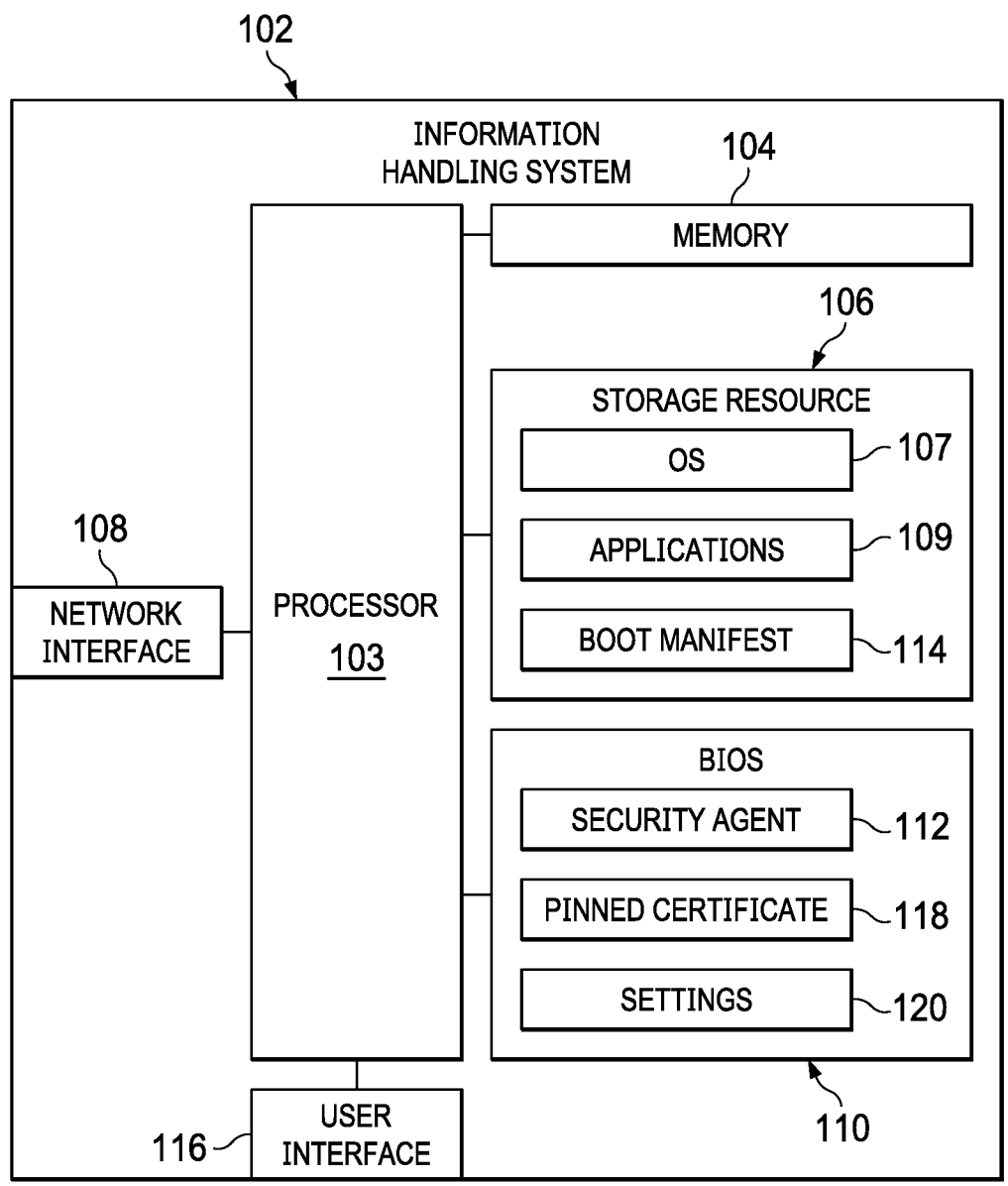
FIG. 1 illustrates a block diagram of an example information handling system, in accordance with certain embodiments of the present disclosure.
Figure 2:
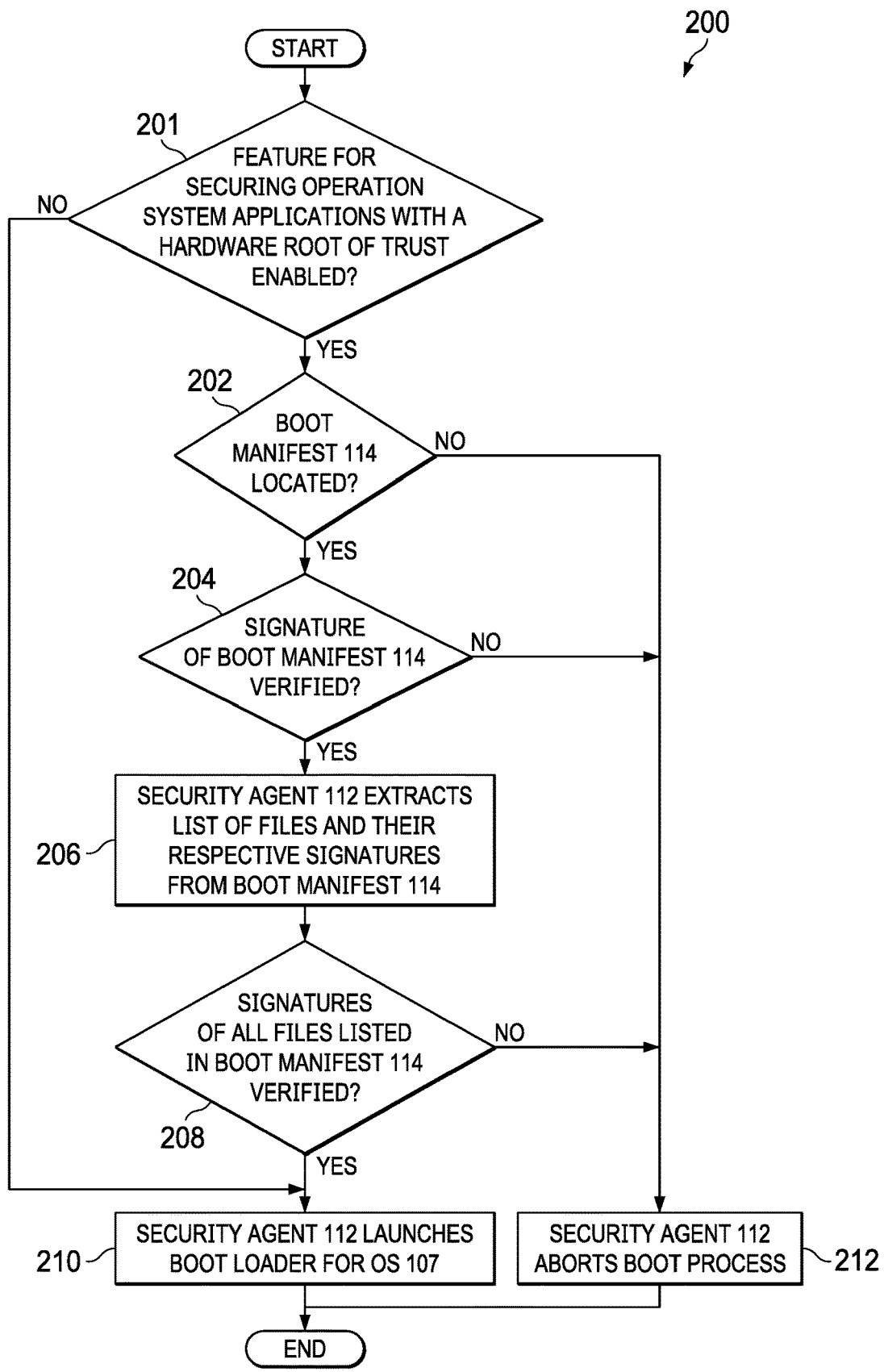
FIG. 2 illustrates a flow chart of an example method for securing operating system applications with a hardware root of trust, in accordance with certain embodiments of the present disclosure.
Figure 3:
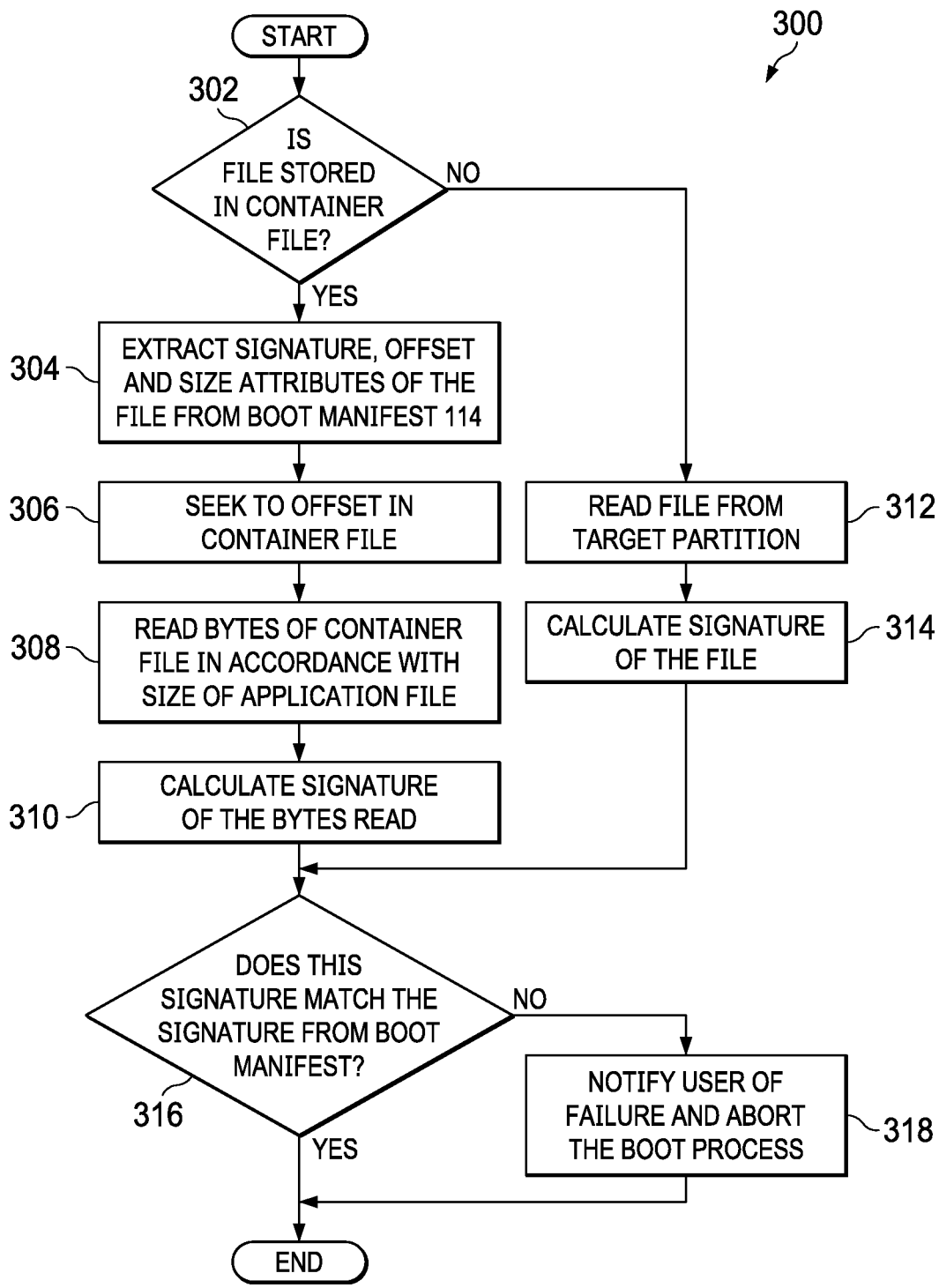
FIG. 3 illustrates a flow chart of an example method for locating a file and verifying its signature, in accordance with certain embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

FIG. 1 illustrates a block diagram of an example information handling system 102, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a storage resource 106 communicatively coupled to processor 103, a network interface 108 communicatively coupled to processor 103, a basic input/output system (BIOS) 110 communicatively coupled to processor 103, and a user interface 116 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. In some embodiments, storage resource 106 may reside internal to a chassis or other enclosure comprising information handling system 102 and not be readily accessible without opening such chassis or other enclosure. In other embodiments, storage resource 106 may reside internal to a chassis or other enclosure comprising information handling system 102.

As shown in FIG. 1, storage resource 106 may have stored thereon an operating system (OS) 107. Operating system 107 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by OS 107. Active portions of OS 107 may be transferred from storage resource 106 to memory 104 for execution by processor 103.

As also shown in FIG. 1, storage resource 106 may have stored thereon applications 109. Applications 109 may comprise any program of executable instructions, or aggregation of programs of executable instructions, configured to execute within OS 107 in order to perform a particular task or functionality. In some embodiments, an application 109 may comprise a custom shell or a custom launcher application. OS 107 and applications 109 may be packaged in container files in Windows Image Management (WIM) format, a ZIP archive, or other container file format.

Further as shown in FIG. 1, storage resource may have stored thereon boot manifest 114. Boot manifest 114 may comprise a digitally-signed list of files stored on an OS volume of storage resource 106 and a digital signature for each file listed in boot manifest 114.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 110 may implement a security agent 112, a pinned certificate 118, and settings 120. Security agent 112 may comprise any program of executable instructions, or aggregation of programs of executable instructions, configured to secure one or more applications 109 executing on OS 107 with a hardware root of trust, as described in greater detail below.

Security agent 112 may use pinned certificate 118 to verify a signature of boot manifest 114. As also described in greater detail below, security agent may use boot manifest 114 to verify files on an OS volume of storage resource 106 and signatures of such files.

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

In operation, if such functionality is enabled in settings 120, security agent 112 executing within BIOS 110 may verify the signature of boot manifest 114, extract the list of files within boot manifest 114 and their respective signatures, and verify the signatures against the files as stored on the OS volume of storage resource 106. Should the verification of the signatures of the files pass, security agent 112 may then permit execution of the boot loader for OS 107. Otherwise, should the verification of one or more of the signatures of the files fails, security agent 112 may prevent execution of the boot loader for OS 107, or take another remedial action.

FIG. 2 illustrates a flow chart of an example method 200 for securing operating system applications with a hardware root of trust, in accordance with certain embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 201, security agent 112 may determine (e.g., from settings 120) whether the feature for securing operating system applications with a hardware root of trust is enabled (e.g., enabled by a user or administrator configuration option). If the feature is enabled, method 200 may proceed to step 202. Otherwise, method 200 may proceed to step 210.

At step 202, in connection with the secure boot process of BIOS 110, security agent 112 may attempt to locate boot manifest 114. If boot manifest 114 is found, method 200 may proceed to step 204. Otherwise, method 200 may proceed to step 212.

At step 204, security agent 112 may attempt to verify a signature (e.g., fingerprint, hash, other unique characteristic) of boot manifest 114 against a stored, secured signature for boot manifest 114. If the signature of boot manifest 114 is verified, method 200 may proceed to step 206. Otherwise, method 200 may proceed to step 212.

At step 206, security agent 112 may extract a list of files and their respective signatures from boot manifest 114. At step 208, security agent 112 may locate each file set forth on the list and verify the signature of each file.

To illustrate such signature verification, OS 107 may be implemented in file system wherein BIOS 110 can locate each file using a file system driver. OS 107 and applications 109 may be stored in a container file (e.g., a WIM file, VHD file, ZIP archive or ISO file). Thus, security agent 112 may locate application content in such containers without necessary drivers in BIOS 110. For instance, security agent may use an offset attribute, file size attribute, and/or other attribute as set forth in boot manifest, and extract a portion of a container based on such attributes. To perform verification, security agent 112 may calculate a signature of such portion and compare such signature against the corresponding signature in boot manifest 114. This process of step 208 may be implemented using method 300 described below in reference to FIG. 3. If the signatures of all files listed in the boot manifest 114 are verified, method 200 may proceed to step 210. Otherwise, method 200 may proceed to step 212.

At step 210, security agent 112 may launch a boot loader for OS 107. After completion of step 210, method 200 may end.

At step 212, security agent 112 may abort the boot process for information handling system 102, including preventing the launch of the boot loader for OS 107. After completion of step 212, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

FIG. 3 illustrates a flow chart of an example method 300 for locating a file and verifying its signature, in accordance with certain embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, for a particular application file, security agent 112 may determine if the application file is stored within a container file. If the application file is stored within a container file, method 300 may proceed to step 304. Otherwise, method 300 may proceed to step 312.

At step 304, security agent 112 may extract a signature, offset attribute, and file size attribute of the application file from boot manifest 114. At step 306, security agent 112 may seek to an offset within the container file defined by the offset attribute. At step 308, security agent 112 may read a number of bytes from the offset, the number of bytes defined by the file size attribute. At step 310, security agent 112 may calculate a signature of the bytes read.

At step 312, security agent 112 may read the application file from the target partition. At step 314, security agent 112 may calculate a signature of the application file.

At step 316, security agent 112 may determine if the signature calculated at step 310 or step 314 matches the signature of the application file stored in boot manifest 114. If the signature calculated at step 310 or step 314 matches the signature of the application file stored in boot manifest 114, method 300 may end, but may be repeated for each desired application file. If the signature calculated at step 310 or step 314 fails to match the signature of the application file stored in boot manifest 114, security agent 112 may notify a user of the failure and abort the boot process. After completion of step 318, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor device; and
   a non-transitory computer readable medium, communicatively coupled to the processor device, including executable instruction for a basic input/output system (BIOS) wherein the instructions, when executed by the processor device, cause the processor to perform BIOS operations including:
   extracting from a boot manifest a list of files associated with application programs configured to execute within an operating system of the information handling system and respective signatures for each of the files;
   locating the files listed in the boot manifest on a partition of a storage resource accessible to the processor device;
   attempting to verify signatures for each of the files as stored on the storage resource against the respective signatures set forth in the boot manifest;
   enabling execution of a boot loader for the operating system and the application programs in response to successful verification of the signatures; and
   aborting a boot process of the information handling system in response to unsuccessful verification of the signatures; wherein:
      locating the files listed in the boot manifest comprises determining whether an application program file is located in a container file and, responsive to determining that the application program file is stored in the container file, locating the application program file within the container file stored within a partition of the operating system, extracting an offset attribute and a size attribute of the application program file from the boot manifest, seeking to an offset in the container file in accordance with the offset attribute, and reading bytes of the container file in accordance with the size attribute.

2. The information handling system of claim 1, wherein: the boot manifest is signed with a digital signature; and the BIOS operations include verifying the digital signature prior to locating the files listed in the boot manifest on the storage resource.

3. The information handling system of claim 2, wherein the BIOS operations include aborting the boot process of the information handling system in response to unsuccessful verification of the digital signature.

4. The information handling system of claim 2, wherein verifying the digital signature prior to locating the files comprises using a pinned certificate of the BIOS.

5. The information handling system of claim 1, wherein the BIOS operations comprise Unified Extensible Firmware Interface instructions.

6. A method comprising, in a basic input/output system (BIOS) of an information handling system:
   extracting from a boot manifest a list of files associated with application programs configured to execute within an operating system of the information handling system and respective signatures for each of the files;
   locating the files listed in the boot manifest on a partition of a storage resource of the information handling system;
   attempting to verify signatures for each of the files as stored on the storage resource against the respective signatures set forth in the boot manifest;
   enabling execution of a boot loader for the operating system and the application programs in response to successful verification of the signatures; and
   aborting a boot process of the information handling system in response to unsuccessful verification of the signatures;
   wherein:
      locating the files listed in the boot manifest comprises determining whether an application program file is located in a container file and, responsive to determining that the application program file is stored in the container file, locating the application program file within the container file stored within a partition of the operating system, extracting an offset attribute and a size attribute of the application program file from the boot manifest, seeking to an offset in the container file in accordance with the offset attribute, and reading bytes of the container file in accordance with the size attribute.

7. The method of claim 6, wherein:
   the boot manifest is signed with a digital signature; and
   the method further comprises verifying the digital signature prior to locating the files listed in the boot manifest on the storage resource.

8. The method of claim 7, further comprising aborting the boot process of the information handling system in response to unsuccessful verification of the digital signature.

9. The method of claim 7, wherein verifying the digital signature prior to locating the files comprises using a pinned certificate of the BIOS.

10. The method of claim 6, wherein the BIOS comprises a Unified Extensible Firmware Interface.

11. An article of manufacture comprising:
    a non-transitory computer readable medium including computer-executable instructions readable by a processor, the instructions, when read and executed, for causing the processor to, in a basic input/output system (BIOS) of an information handling system perform BIOS operations, wherein the BIOS operations include:
    extracting from a boot manifest a list of files associated with application programs configured to execute within an operating system of the information handling system and respective signatures for each of the files;
    locating the files listed in the boot manifest on a partition of a storage resource of the information handling system;
    attempting to verify signatures for each of the files as stored on the storage resource against the respective signatures set forth in the boot manifest;

enabling execution of a boot loader for the operating system and the application programs in response to successful verification of the signatures; and aborting a boot process of the information handling system in response to unsuccessful verification of the signatures;

wherein:

locating the files listed in the boot manifest comprises determining whether an application program file is located in a container file and, responsive to determining that the application program file is stored in the container file, locating the application program file within the container file stored within a partition of the operating system, extracting an offset attribute and a size attribute of the application program file from the boot manifest, seeking to an offset in the container file in accordance with the offset attribute, and reading bytes of the container file in accordance with the size attribute.

12. The article of claim 11, wherein:
the boot manifest is signed with a digital signature; and
the BIOS operations include verifying the digital signature prior to locating the files listed in the boot manifest on the storage resource.

13. The article of claim 12, wherein the BIOS operations include aborting the boot process of the information handling system in response to unsuccessful verification of the digital signature.

14. The article of claim 12, wherein verifying the digital signature prior to locating the files comprises using a pinned certificate of the BIOS.

15. The article of claim 11, wherein the BIOS comprises a Unified Extensible Firmware Interface.

* * * * *